(12) United States Patent
Kirbas (10) Patent No.: US 8,380,125 B2
(45) Date of Patent: Feb. 19, 2013

(54) SYSTEMS AND METHODS FOR BLUETOOTH RESOURCE CONSERVATION

(75) Inventor: Bilhan Kirbas, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 596 days.

(21) Appl. No.: 10/931,712

(22) Filed: Sep. 1, 2004

(65) Prior Publication Data

US 2006/0046653 A1 Mar. 2, 2006

(51) Int. Cl.
*H04B 7/00* (2006.01)
(52) U.S. Cl. ...................................................... 455/41.2
(58) Field of Classification Search ................ 455/41.2, 455/574, 556.1, 573, 75.1, 575.2, 575.3, 455/575.4
See application file for complete search history.

(56) References Cited

U.S. PATENT DOCUMENTS

| | | | | |
|---|---|---|---|---|
| 4,203,101 A * | 5/1980 | Towsend | | 340/635 |
| 5,109,162 A * | 4/1992 | Koch et al. | | 307/127 |
| 5,572,571 A * | 11/1996 | Shirai | | 455/551 |
| 5,601,436 A * | 2/1997 | Sudman et al. | | 434/307 R |
| 6,571,103 B1 | 5/2003 | Novakov | | |
| 6,571,111 B1 * | 5/2003 | Mayo et al. | | 455/574 |
| 6,741,836 B2 * | 5/2004 | Lee et al. | | 455/41.2 |
| 6,745,054 B2 * | 6/2004 | Fraccaroli | | 455/567 |
| 6,892,083 B2 * | 5/2005 | Shostak | | 455/575.6 |
| 6,968,219 B2 * | 11/2005 | Pattabiraman et al. | | 455/574 |
| 6,973,335 B2 * | 12/2005 | Ganton | | 455/573 |
| 7,046,649 B2 * | 5/2006 | Awater et al. | | 370/338 |
| 7,079,811 B2 * | 7/2006 | Lee et al. | | 455/41.2 |
| 7,088,691 B2 * | 8/2006 | Fujita | | 370/311 |
| 7,103,344 B2 * | 9/2006 | Menard | | 455/343.2 |
| 7,110,755 B2 * | 9/2006 | Shibasaki et al. | | 455/420 |
| 7,116,938 B2 * | 10/2006 | Monroe et al. | | 455/41.2 |
| 7,146,189 B1 * | 12/2006 | Kotzin | | 455/557 |
| 7,215,923 B2 * | 5/2007 | Hillyard | | 455/41.1 |
| 7,221,954 B2 * | 5/2007 | Backes et al. | | 455/522 |
| 7,333,829 B2 * | 2/2008 | Malone et al. | | 455/552.1 |
| 7,333,838 B2 * | 2/2008 | Pattabiraman et al. | | 455/574 |
| 7,403,512 B2 * | 7/2008 | Tsai et al. | | 370/338 |
| 7,502,591 B2 * | 3/2009 | Dabak et al. | | 455/41.2 |
| 7,515,897 B2 * | 4/2009 | Suzuki | | 455/343.2 |
| 2001/0010689 A1 * | 8/2001 | Awater et al. | | 370/344 |
| 2002/0004402 A1 * | 1/2002 | Suzuki | | 455/456 |
| 2002/0034965 A1 * | 3/2002 | Hirai et al. | | 455/557 |
| 2002/0059434 A1 * | 5/2002 | Karaoguz et al. | | 709/228 |
| 2002/0082060 A1 * | 6/2002 | Kang et al. | | 455/574 |
| 2002/0173295 A1 * | 11/2002 | Nykanen et al. | | 455/414 |
| 2002/0196360 A1 * | 12/2002 | Miyadera | | 348/373 |

(Continued)

OTHER PUBLICATIONS

Bluetooth Specification 1.2 [vol. 2], link controller operation, pp. 133-134, May 11, 2003.*

(Continued)

*Primary Examiner* — Duc Nguyen
*Assistant Examiner* — Ankur Jain (57) ABSTRACT

A Bluetooth device searches for another Bluetooth device or a Bluetooth command in response to a user intervention event. A user intervention event can take many forms, such as, for example, a connection to a power source or communication device, a mechanical configuration change, or a user input. Specifically, a Bluetooth device begins searching when the user intervention event takes place. To list some examples, the Bluetooth device may enter a page state, a page scan state, an inquiry state or an inquiry scan state in response to the user intervention. Alternatively, as more examples, if the Bluetooth device is in a sniff mode, a hold mode or a park state, the Bluetooth device may enter the active mode in response to the user intervention event.

35 Claims, 3 Drawing Sheets

U.S. PATENT DOCUMENTS

| | | | |
|---|---|---|---|
| 2003/0036354 A1* | 2/2003 | Lee et al. | 455/41 |
| 2003/0081603 A1* | 5/2003 | Rune | 370/390 |
| 2003/0115490 A1* | 6/2003 | Russo et al. | 713/202 |
| 2003/0119568 A1* | 6/2003 | Menard | 455/572 |
| 2003/0190938 A1* | 10/2003 | Ganton | 455/574 |
| 2004/0002305 A1* | 1/2004 | Byman-Kivivuori et al. | 455/41.2 |
| 2004/0033795 A1* | 2/2004 | Walsh et al. | 455/404.1 |
| 2004/0041538 A1 | 3/2004 | Sklovsky | |
| 2004/0068666 A1 | 4/2004 | Tosey | |
| 2004/0077383 A1* | 4/2004 | Lappetelainen et al. | 455/574 |
| 2004/0162106 A1* | 8/2004 | Monroe et al. | 455/552.1 |
| 2004/0185920 A1* | 9/2004 | Choi et al. | 455/575.1 |
| 2004/0198219 A1* | 10/2004 | Malmstrom et al. | 455/41.1 |
| 2004/0198458 A1* | 10/2004 | Kawamura | 455/566 |
| 2004/0198477 A1* | 10/2004 | Jung et al. | 455/575.4 |
| 2004/0203351 A1* | 10/2004 | Shearer et al. | 455/41.1 |
| 2004/0203362 A1* | 10/2004 | Pattabiraman et al. | 455/41.2 |
| 2004/0204202 A1* | 10/2004 | Shimamura et al. | 455/575.1 |
| 2004/0205189 A1* | 10/2004 | Sata et al. | 709/225 |
| 2004/0214758 A1* | 10/2004 | Meyers et al. | 514/12 |
| 2004/0233173 A1* | 11/2004 | Bryant | 345/169 |
| 2004/0233475 A1* | 11/2004 | Mikuni et al. | 358/1.15 |
| 2004/0239799 A1* | 12/2004 | Suzuki et al. | 348/370 |
| 2004/0266480 A1* | 12/2004 | Hjelt et al. | 455/558 |
| 2005/0002372 A1* | 1/2005 | Rune et al. | 370/346 |
| 2005/0020097 A1* | 1/2005 | Kawahigashi et al. | 439/38 |
| 2005/0032557 A1* | 2/2005 | Brunstrom et al. | 455/575.1 |
| 2005/0070348 A1* | 3/2005 | Lee et al. | 455/575.4 |
| 2005/0114714 A1* | 5/2005 | Albulet | 713/300 |
| 2005/0194446 A1* | 9/2005 | Wiklof et al. | 235/462.46 |
| 2005/0197093 A1* | 9/2005 | Wiklof et al. | 455/343.1 |
| 2005/0250562 A1* | 11/2005 | Carroll | 455/575.3 |
| 2005/0282592 A1* | 12/2005 | Frerking et al. | 455/575.2 |
| 2006/0044723 A1* | 3/2006 | Beneditz et al. | 361/90 |
| 2006/0046650 A1* | 3/2006 | Kohli et al. | 455/41.2 |
| 2006/0084469 A1* | 4/2006 | Malone et al. | 455/552.1 |
| 2006/0140166 A1* | 6/2006 | Albulet | 370/346 |
| 2006/0146009 A1* | 7/2006 | Syrbe et al. | 345/156 |
| 2006/0229118 A1* | 10/2006 | Kaneko | 455/575.3 |
| 2007/0004476 A1* | 1/2007 | Lee | 455/575.4 |
| 2007/0105548 A1* | 5/2007 | Mohan et al. | 455/426.1 |
| 2007/0249383 A1* | 10/2007 | Wiklof et al. | 455/522 |
| 2009/0017875 A1* | 1/2009 | Boesen | 455/566 |

OTHER PUBLICATIONS

Bluetooth, Bluetooth Protocol Architecture, Riku Mettala, Version 1.0, pp. 1-20, Sep. 29, 1999 or Aug. 25, 1999.

Bluetooth Specification, Version 1.2 (vol. 1), Architecture, pp. 33-37, Publ. Bluetooth Special Interest Group, Nov. 5, 2003.

Ad Bluetooth Specification, Version 1.2 (vol. 2), Radio Specification, pp. 31-38, Publ. Bluetooth Special Interest Group, Nov. 5, 2003.

Bluetooth Specification, Version 1.2 (vol. 2), Baseband Specification, pp. 53-70, Publ. Bluetooth Special Interest Group, Nov. 5, 2003.

Bluetooth Specification, Version 1.2 (vol. 2), Baseband Specification, pp. 133-148, Publ. Bluetooth Special Interest Group, Nov. 5, 2003.

Bluetooth Specification, Version 1.2 (vol. 2), Baseband Specification, pp. 149-188, Publ. Bluetooth Special Interest Group, Nov. 5, 2003.

* cited by examiner

SYSTEMS AND METHODS FOR BLUETOOTH RESOURCE CONSERVATION

BACKGROUND OF THE INVENTION

1. Field of the Invention

The invention relates generally to wireless communication and more particularly to Bluetooth wireless communication.

2. Background

Consumers are increasingly demanding long battery life and more consistent connections for wireless communication devices, including short range wireless communication devices. The Bluetooth wireless communication standard, as defined in the IEEE Std 802.15, defines a short range wireless communication system (also known as a wireless personal area network (WPAN)) for use on consumer electronic devices. See IEEE Std 802.15, The Institute of Electrical and Electronics Engineers, Inc., New York, N.Y., 1999 (Reaff 2003).

There are many Bluetooth applications. One example is a cellular telephone having Bluetooth connections to a wireless (Bluetooth) headset. That is, a cellular telephone, in addition to having a cellular transceiver (e.g., U.S. personal communication system (PCS) transceiver or a global system for mobile communication (GSM) transceiver), would have a Bluetooth transceiver for communicating with a headset. The headset also has a Bluetooth transceiver. The headset additionally has a speaker and a microphone for transmitting audio information (typically voice) to and from the user. With such a Bluetooth cellular telephone and headset, the user does not have to use a loudspeaker or hold the cellular telephone close to the user's ear and mouth to talk and listen. Essentially, this is a convenient way of carrying on a "hands free" conversation.

One problem with such an arrangement is that the cellular telephone and headset consume power while searching in Bluetooth, as will be described more fully below. This is especially problematic in portable applications with limited portable power supplies, such as, for example, as described above, in cellular telephones and wireless headsets.

Another example of a Bluetooth application is a Bluetooth connection between a Bluetooth enabled cellular telephone and a Bluetooth enabled automobile. For example, a cellular telephone might download map data, such as, for example, a map, over the cellular communication network for use with the automobile navigation system. The map data may be transferred from the cellular telephone to the automobile via a Bluetooth communication.

Searching in Bluetooth consumes power. Searching can be defined as checking for the presence of another Bluetooth device or for a Bluetooth command from another device. For example, a Bluetooth module in any of the following states or modes is considered searching: page state, page scan state, inquiry state, inquiry scan state, sniff mode, hold mode and park state. See IEEE Std 802.15, Volume 2, Part B, Section 8, pp. 133-188.

Bluetooth communication systems are made up of peer to peer communications. That is, there is no base station or central network. In a Bluetooth peer to peer connection, one of the peers, known as the master Bluetooth device, or simply as the master, controls the communication. The other peer, known as the slave Bluetooth device, or simply as the slave, is controlled by the master. One master can control up to seven slaves in the present Bluetooth standard. A grouping of a master and one or more connected slaves is called a piconet. Piconets can be connected together to form a scatternet. The arrangements of piconets and scatternets will not be described further here.

In page state, a Bluetooth module transmits a Bluetooth signal attempting to connect to another particular Bluetooth device. A Bluetooth page includes the address of the particular device and asks that particular device to connect. For example, in page mode, a Bluetooth enabled cellular telephone might page the headset to establish a connection between the headset and the cellular telephone. The paging device typically becomes the master.

In page scan state, a Bluetooth module turns its receiver on and tunes its receiver to receive a Bluetooth page signal. This is also known as listening for a page. The page scanning device typically becomes the slave.

In inquiry state, a Bluetooth module transmits a Bluetooth signal asking any Bluetooth enabled devices that receives the signal to respond and give its address, so that a Bluetooth connection can be established. For example a Bluetooth enabled cellular telephone might inquire whether a Bluetooth enabled wireless headset is within range of the Bluetooth enabled cellular telephone.

In inquiry scan state a Bluetooth module turns its receiver on and tunes its receiver to receive a Bluetooth inquiry signal. This is also known as listening for an inquiry.

Sniff mode is a Bluetooth mode in which a slave Bluetooth device is made to turn its receiver off except at regular intervals. The slave device in sniff mode can save power and resources this way. However, at the regular intervals, the slave Bluetooth device turns its receiver on and listens for a signal from the master Bluetooth device. Commonly, when in sniff mode, a slave device may turn its receiver on repeatedly without returning to active communication with the master Bluetooth device.

Hold mode is a Bluetooth mode in which a slave Bluetooth device is made to turn its receiver off for a predetermined time period. The slave device in hold mode can save power and resources this way, similar to sniff mode. However, at the end of the predetermined time period, the slave Bluetooth device turns its receiver and transmitter on and returns to the active mode.

In park state, a Bluetooth module of a slave Bluetooth device is made to turn its receiver off except at regular intervals. The master Bluetooth device sends a beacon signal to the slave in the park state, to help the slave maintain the connection with the master Bluetooth device. Also, if the master Bluetooth device wants the slave Bluetooth device to return to the active mode, the master Bluetooth device will send an indicator signal as part of the beacon signal to the slave Bluetooth device telling the slave Bluetooth device to return to the active mode.

The park state is similar to sniff mode in the sense that a device in either park state or sniff mode keeps its receiver off except at regular intervals. There are other differences and similarities which will not be described here more fully. However, at the regular intervals, the slave Bluetooth device turns its receiver on and listens to the beacon signal from the master Bluetooth device. Commonly, when in the park state, a slave device may turn its receiver on repeatedly and listen to the beacon signal without returning to an active connection with the master Bluetooth device.

Accordingly, searching consumes considerable power or Bluetooth network resources or both. Further, Bluetooth page signals, inquiry signals and beacon signals can cause interference with other signals, including other Bluetooth signals and other communication system signals, such as, for example, wireless local area network (WLAN) signals, such as signals conforming to the IEEE Std 802.11b or IEEE Std 802.11g, (hereinafter, collectively "802.11"). See IEEE Std 802.11b and IEEE Std 802.11g, The Institute of Electrical and Electronics Engineers, Inc., New York, N.Y., 1999 (Reaff 2003). Both Bluetooth and 802.11 signals operate at a frequency of approximately 2.4 GHz. This makes it difficult, if not impossible, for Bluetooth and 802.11 communications to occur simultaneously in the same location.

SUMMARY OF THE INVENTION

In order to overcome the problems associated with conventional Bluetooth searching, a Bluetooth device searches in response to a user intervention event. A user intervention event can take many forms, such as, for example, a connection to a power source or communication device, a mechanical configuration change, or a user input.

Specifically, a Bluetooth device begins searching when the user intervention event takes place. To list some examples, the Bluetooth device may enter a page state, a page scan state, an inquiry state or an inquiry scan state in response to the user intervention. Alternatively, as more examples, if the Bluetooth device is in a sniff mode, a hold mode or a park state the Bluetooth device may enter the active mode in response to the user intervention event.

Advantageously, the Bluetooth device may save power and network resources by keeping its transmitter or receiver or both off. Additionally, the Bluetooth device may interfere with other communications less by keeping its transmitter or receiver or both off.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION

Figures 1, 2:
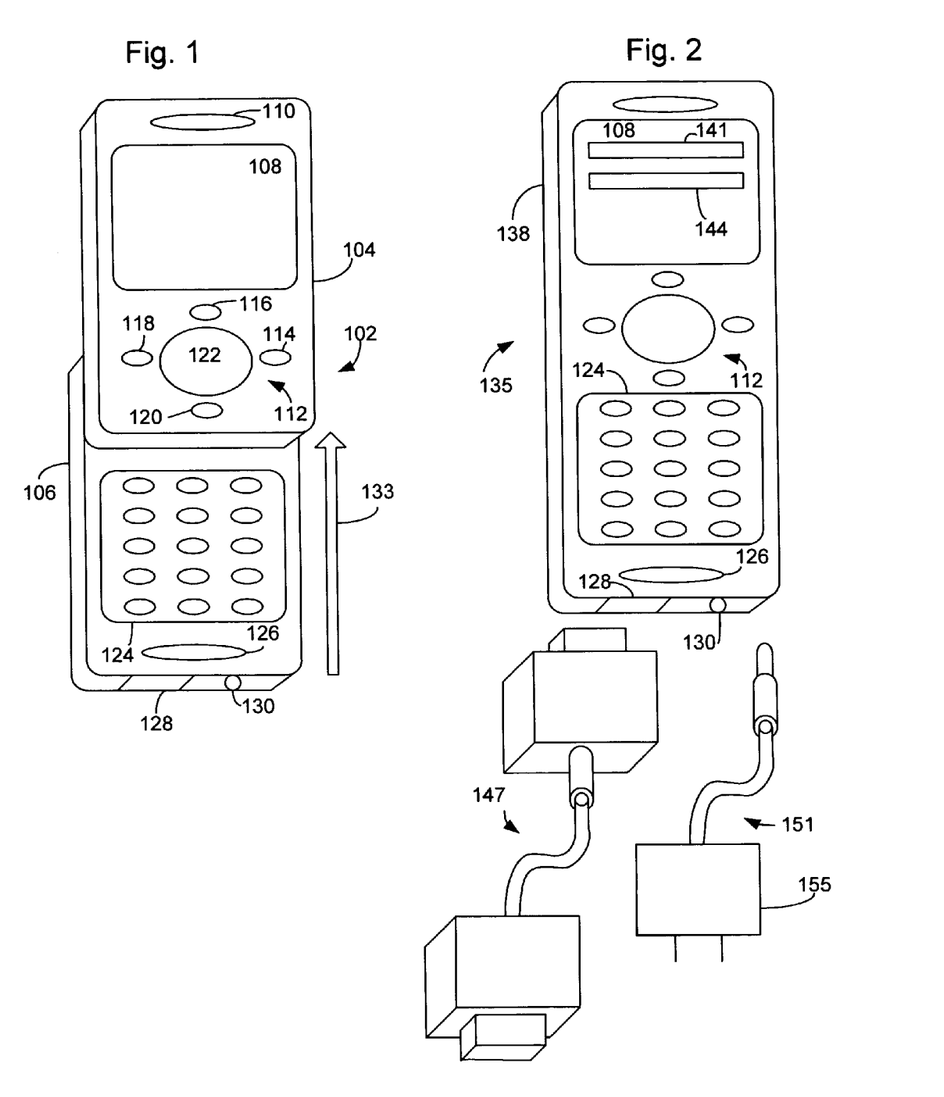
FIG. 1 shows a perspective view of a Bluetooth enabled cellular telephone illustrating one user intervention event.
FIG. 2 shows a perspective view of a Bluetooth enabled cellular telephone illustrating several user intervention events.

A Bluetooth device searches in response to a user intervention event. FIG. 1 shows a perspective view of a Bluetooth device undergoing a user intervention event. The Bluetooth device 102 may be a cellular telephone, as depicted in FIG. 1. The cellular telephone 102 is a slider type cellular telephone. Specifically, the cellular telephone has a top housing portion 104 and a bottom housing portion 106. The top housing portion includes a display screen 108, a speaker 110 and a menu navigation keypad 112, including one or more navigation keys 114, 116, 118, 120 and 122. The bottom housing portion 106 includes a keypad 124, a microphone 126, a communication connector 128 and a power supply connector 130.

The top housing portion 104 is slidably connected to the bottom housing portion 106. Specifically, the top housing portion 104 slides over the bottom housing portion 106 covering at least the keypad 124. A user intervention event 133 is represented by arrow 133. As shown in FIG. 1, the user intervention event is sliding the top portion up, relative to the bottom portion. That is, the top housing portion 104 has just been slid up revealing the keypad 124 and extending the overall length of the cellular telephone 102.

Advantageously, the cellular telephone 102, which is Bluetooth enabled, begins searching in response to the sliding up event. This is advantageous because the cellular telephone conserves power or communication resources or both by not searching until the sliding up. Specifically, a user would typically slide the top housing portion up, when the user wants to place a call. That is typically when a user would want the Bluetooth module to wake up. Waking up will be described more fully below, with respect to FIG. 4.

For example, the user may want to use a Bluetooth enabled headset with the Bluetooth enabled cellular telephone. But the user does not need the Bluetooth enabled cellular telephone and the Bluetooth enabled headset to be communicating with each other, and maintaining a connection prior to that time. Therefore, for example, the cellular telephone's Bluetooth module may enter a page state in response to the sliding up.

The user intervention event may be another type of mechanical configuration change. For example, the user intervention event might be a rotation of top housing portion 104 relative to bottom housing portion. For example, the cellular telephone may be a flip phone and the housing portions 104 and 106 might open like a clam shell. Other mechanical configuration user intervention events are possible as well. For example, the housing portions 104 and 106 might swivel relative to each other.

FIG. 2 shows a perspective view of Bluetooth enabled cellular telephone 135 and several user intervention mechanisms. The cellular telephone shown with respect to FIG. 2 is similar to the cellular telephone shown with respect to FIG. 1, except that the cellular telephone 135 shown with respect to FIG. 2 only has one housing portion 138. It does not have a second, sliding portion. The cellular telephone 135 has a display screen 108, a keypad 124 and a navigation keypad 112.

The display screen has several menu entries 141 and 144 displaying various options for selection by the user. The user can press one of the keys on keypad 124 or navigation keypad 112 to select an option. Additionally, the user can navigate within the menu by pushing one of the keys on keypad 124 or navigation keypad 112. For example, menu entry 141 may be highlighted or otherwise indicated, and the user may wish to select menu entry 144. The user may navigate to entry 144 by pushing one of the keys and then select entry 144 by pushing one of the keys. One of the options 141 or 144 is an activate Bluetooth option 144. The user can cause the Bluetooth module to enter an activity state by selecting the activate Bluetooth option 144. Alternatively, the menu option 144 can be selected by speaking into microphone 126 if the cellular telephone 135 has a voice recognition module.

The menu is stored in a memory and generated for display on the display screen 108 by a processor. The processor and memory will be described more fully below, with respect to FIG. 3.

A communication adapter 147 is also shown with respect to FIG. 2. The communication adapter 147 connects to the cellular telephone 135 by plugging into communication connector 128. The communication adapter 147 can be used to transfer data between the cellular telephone 135 and another electronic device (not shown), such as, for example, a computer. The communication adapter 147 may be, for example, a universal serial bus (USB) connector, or a serial data connector, or any other convenient type of communication adapter. The cellular telephone has a sensor connected to the communication connector 128 for sensing when a communication adapter 147 is connected to the communication connector. The Bluetooth module is connected to the sensor. When the communication adapter 147 is connected to the cellular telephone, the Bluetooth module is notified and the Bluetooth module enters an activity state, such as, for example, a page state.

A power adapter 151 is also shown with respect to FIG. 2. The power adapter 151 can be plugged into the cellular telephone at power connector 130 for providing power to the cellular telephone. As is well known, the power adapter may provide power to the processor the transceiver and the portable power supply, such as a battery. The power adapter 151 has a plug 155, for connecting the power adapter to a power supply. The power supply may be a wall outlet, as is well known. Alternatively, the power supply may be an automobile. In that case, the plug 155 might be adapted to fit into an automobile lighter power supply, as is well known. In that case, the power adapter 151 would be a car power adapter.

The power connector 130 is connected to a power connection sensor 204. When a power adapter 151 is connected to the cellular telephone 135, the power connection sensor 204 senses the power adapter 151. The power connection sensor 204 is connected to the Bluetooth module. In response to a signal from the power connection sensor 204, the Bluetooth module enters an activity state. For example, the Bluetooth module may enter a page state or a page scan state.

In addition to plugging a communication adapter or a power adapter, the user intervention event might be plugging in an adapter that provides both communication and power. One device that provides both power and communication is a sync cradle. A sync cradle is a cradle for a cellular telephone that provides power and functionality for synchronizing various software on a the cellular telephone with software on another electronic device, such as, for example, synchronizing a scheduling program on the cellular telephone with a scheduling program on a computer. Plugging any device into the cellular telephone can be a user intervention event.

Figure 3:
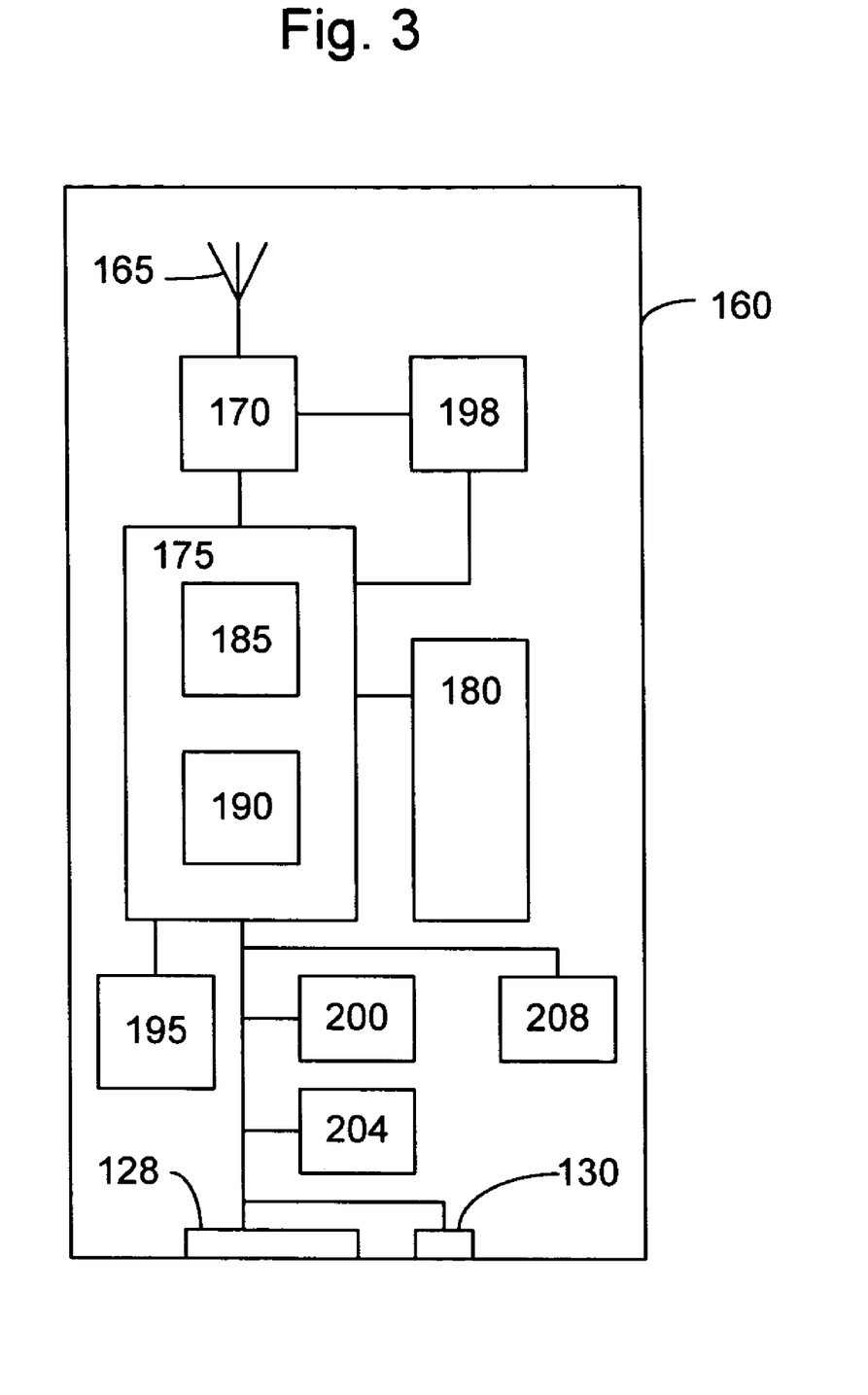
FIG. 3 shows a block diagram of a Bluetooth enabled cellular telephone.

The various parts and functions of a Bluetooth enabled cellular telephone will now be described with respect to FIG. 3. FIG. 3 shows a block diagram of a Bluetooth enabled cellular telephone 160. The cellular telephone 160 includes an antenna 165 for communicating radio frequency RF signals over the air. The antenna 165 is connected to an RF circuit 170 for converting the RF signal to a digital signal and for converting a digital signal to an RF signal. The RF circuit may include, for example, any one or more of the following: a duplexer, a filter, a mixer and an RF amplifier. The RF circuit 170 includes a Bluetooth RF circuit and a cellular communication RF circuit. One or more of the components may be re-used between the Bluetooth circuit and the cellular communication circuit. The cellular communication circuit communicates cellular communication signals, such as, for example, U.S. PCS signals or GSM signals. Other communication signals are possible, such as, for example, U.S. cellular communication between 824 and 899 MHz.

One antenna 165 and one RF circuit 170 are shown. Other configurations are possible. For example, the cellular telephone may have one antenna for Bluetooth communication and another antenna for cellular communication. Alternatively, the cellular telephone may have an adaptable antenna or antennas that can be adapted to be used for cellular communications or for Bluetooth.

The RF circuit 170 is connected to a processor block 175. The processor block performs many functions for the cellular telephone. The processor block demodulates and decodes the digital signal so that the signal can be sued by the cellular telephone. For example, if the cellular communication signal contains an audio signal, the processor block demodulates and decodes the digital signal to present the audio signal at a user interface device 180 such as a speaker. Only one user interface device is shown with respect to FIG. 3, but, at least four user interface devices are common on a cellular telephone, namely, a speaker 110, a display screen 108, a keypad 124 and a microphone 126, shown with respect to FIGS. 1 and 2. Other user interface devices are possible.

The processor block 175 includes a cellular communication module 185 and a Bluetooth module 190. The cellular communication module demodulates the digital cellular communication signals, as described above. The Bluetooth module 190 demodulates the Bluetooth signals and controls the states and modes of a Bluetooth state machine, which will be described with respect to FIG. 4.

As will be understood by those of skill in the art, the processor block 175 may include one or more processors. For example, the Bluetooth module functions may be controlled by a Bluetooth processor while the cellular communication functions may be controlled by a separate processor. Additionally, as is well known in the art, one or more of the functions and processes described herein may be performed by discreet logic or any other device such as, for example, a field programmable gate array (FPGA), separately or in conjunction with a processor.

The processor block 175 is connected to a memory block 195. The memory block may include one or more memory components. The memory compon4ents may be any convenient type of memory, such as, for example, flash memory, random access memory, read only memory, volatile memory, non-volatile memory and removable memory. The memory block 195 stores the code and data necessary for the cellular telephone to perform the functions described herein and those functions that are known in the art.

The processor block 175 is also connected to a portable power supply 198, such as, for example, a battery. The portable power supply provides power for the processor block 175. The portable power supply 198 is also connected to the RF circuit 170, for supplying power to the RF circuit. The portable power supply may be connected to other components, such as, for example, the user interface device 180. As depicted in FIG. 3, the portable power supply is connected to the user interface device 180 through the processor block 175.

The processor block 175 is also connected to three sensors, a communication sensor 200, a power connection sensor 204 and a configuration sensor 208. Specifically, the processor block is configured so that the Bluetooth module 190 receives notification if a communication adapter, a power adapter or a configuration change is sensed by the communication sensor 200, the power connection sensor 204 or the configuration sensor 208, respectively. As described above with respect to FIGS. 1 and 2, the Bluetooth module enters an activity state responsive to sensing a communication adapter, a power adapter or a configuration change.

The processor block 175 is also connected to communication connector 128 and power connector 130. Sensors 200 and 204 are shown as separate from the processor block 175. The sensors 200 and 204 may be separate from or included in the processor block 175. For example, a power supply connection to power connector 130 may cause an electrical line connected to a processor in processor block 175 to sense a high voltage. Responsive to sensing the high voltage, the processor may cause the Bluetooth module to enter an activity state.

Figure 4:
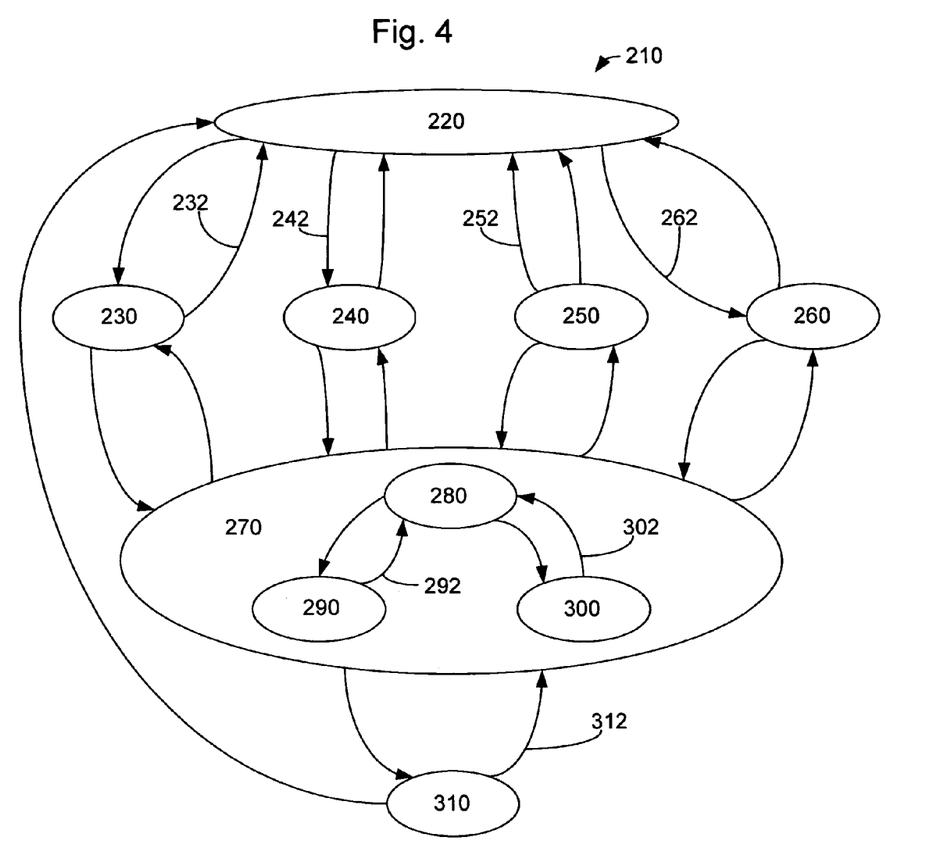
FIG. 4 shows a block diagram of a Bluetooth state machine.

FIG. 4 shows a block diagram of a Bluetooth state machine 210. The Bluetooth state machine is similar to known Bluetooth state machines, except that transitions between passive states and activity states are made in response to user intervention events. Transitioning between a passive state and an activity state is defined as waking up. In a standby state 220, a Bluetooth state machine is on but not transmitting or receiving. The standby state is a passive state. From the standby state 220, the state machine 210 can transition to a page state 230, a page scan state 240, an inquiry state 250 or an inquiry scan state 260, all of which are activity states. Advantageously, the state machine 210 can make these transitions in response to a user intervention event. Thus, arrows 232, 242, 252 and 262 represent user intervention events.

From the page state 230, the page scan state 240, the inquiry state 250 and the inquiry scan state 260 the state machine can return to the standby state. Additionally, from each of states 230, 240, 250 and 260, the state machine can enter the connection state 270. The connection state 270 includes three modes, the active mode 280, the sniff mode 290 and the hold mode 300. The active mode 280 is an activity state, but the sniff mode 290 and the hold mode 300 are passive states. The state machine 210 can enter the active mode 280 from either the sniff mode 290 or the hold mode 300, as represented by arrows 292 and 302. State changes 292 and 302 represent user intervention events.

The state machine can enter the park state 310 from the connection state 270. The park state 310 is a passive state. Additionally, the state machine 210 can enter the connection state 270 from the park state 310 as represented by arrow 312. Advantageously, the state machine may transfer from the park state 310 to the connection state 270 in response to a user intervention event.

By making any one or more of the above described transitions from a passive state to an activity state in response to a user intervention event, the Bluetooth module conserves power or communication resources or both. Conserving communication resources may include reducing interference with other communication systems, such as, for example, 802.11 communication systems.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for controlling a Bluetooth module operatively coupled to a slider wireless communication device, the method comprising the steps of:
providing the slider wireless communication device with a top housing portion slidably connected to a bottom housing portion having a keypad;
associating the Bluetooth module with the slider wireless communication device having a cellular communication module, wherein the slider wireless communication device is operatively coupled to the Bluetooth module;
enabling the top housing portion to slide over the bottom housing portion covering the keypad;
triggering a mechanical configuration user intervention event when the top housing portion is slidably separated from the lower housing portion revealing the keypad corresponding to the bottom portion and extending the length of the slider wireless communication device;
receiving an indication of the mechanical configuration user intervention event from a user intervention sensor that detects the slidable separation between the top housing portion and the bottom housing portion revealing the keypad corresponding to the bottom portion;
waking up the Bluetooth module from a passive stand by state, in which a Bluetooth state machine is on but not transmitting or receiving, to an activity state in response to the mechanical configuration user intervention event, where the intervention sensor has detected the slidable separation between the top housing portion and the bottom housing portion revealing the keypad corresponding to the bottom portion;
sensing a communication adapter connected to a communication connector with a communication sensor that is connected to the communication connector wherein a Bluetooth module is connected to the communication sensor;
sensing a connection of a power source to the slider wireless communication device with a power connection sensor, wherein a Bluetooth module is connected to the power connection sensor;
wherein when the communication adapter is connected to the slider wireless communication device and the power source is connected to the slider wireless communication device the Bluetooth module receives notification that the communication adapter is connected to the communication connector and that the power source is connected to the slider wireless communication device and enters the activity state in response to the notification.

2. The method of claim 1, wherein the step of waking up the Bluetooth module comprises the steps of: changing a state of the Bluetooth module from a stand by state to a page state.

3. The method of claim 1, wherein the step of waking up the Bluetooth module comprises the steps of: changing a state of the Bluetooth module from a stand by state to a page scan state.

4. The method of claim 1, wherein the step of waking up the Bluetooth module comprises the steps of: changing a state of the Bluetooth module from a stand by state to an inquiry state.

5. The method of claim 1, wherein the step of waking up the Bluetooth module comprises the steps of: changing a state of the Bluetooth module from a stand by state to an inquiry scan state.

6. The method of claim 1, wherein the step of waking up the Bluetooth module comprises the steps of: changing a state of the Bluetooth module from a park state to a connection state, wherein the park state is the state in which the Bluetooth module of a slave Bluetooth device is made to turn its receiver off except at regular intervals.

7. The method of claim 1, wherein the step of waking up the Bluetooth module comprises the steps of: changing a mode of the Bluetooth module from a sniff mode to an active mode, wherein the sniff mode is the Bluetooth mode in which a slave Bluetooth device is made to turn its receiver off except at regular intervals.

8. The method of claim 1, wherein the step of waking up the Bluetooth module comprises the steps of: changing a mode of the Bluetooth module from a hold mode to an active mode, wherein the hold mode is the Bluetooth mode in which a slave Bluetooth device is made to turn its receiver off for a predetermined time period.

9. The method of claim 1, wherein the step of receiving an indication of a user intervention event comprises the step of receiving a key input signal.

10. The method of claim 1, wherein the step of receiving an indication of a user intervention event comprises the step of receiving a voice activated signal.

11. The method of claim 1, wherein the step of receiving an indication of a user intervention event comprises the steps of: receiving a menu navigation command; and receiving a menu selection command.

12. The method of claim 1, further comprising the steps of: receiving a wireless communication signal other than a Bluetooth signal; and causing the Bluetooth module to enter a sleep mode, responsive to the step of receiving a wireless communication signal other than a Bluetooth signal.

13. The method of claim 1, wherein the step of receiving an indication of a user intervention event comprises the step of sensing a reconfiguration of a wireless communication device.

14. The method of claim 1, wherein the step of receiving an indication of a user intervention event comprises the step of sensing a reconfiguration of a wireless communication device.

15. The method of claim 14, wherein the step of sensing a reconfiguration comprises the step of sensing sliding a first housing portion relative to a second housing portion.

16. The method of claim 14, wherein the step of sensing a reconfiguration comprises the step of sensing rotating a first housing portion relative to a second housing portion.

17. A method for controlling a Bluetooth module on a processor of a slider wireless communication device, the method comprising the steps of:
providing the slider wireless communication device with a top housing portion slidably connected to a bottom housing portion having a keypad;
associating the Bluetooth module with the slider wireless communication device having a cellular communication module, wherein the slider wireless communication device is operatively coupled to the Bluetooth module;
enabling the top housing portion to slide over the bottom housing portion covering the keypad;
triggering a mechanical configuration user intervention event when the top housing portion is slidably separated from the lower housing portion revealing the keypad corresponding to the bottom portion and extending the length of the slider wireless communication device;
receiving an indication of the mechanical configuration user intervention event from a user intervention that detects the slidable separation between the top housing portion and the bottom housing portion revealing the keypad corresponding to the bottom portion;
waking up the Bluetooth module from a passive stand by state, in which a Bluetooth state machine is on but not transmitting or receiving, to an active state in response to the mechanical configuration user intervention event, where the intervention sensor has detected the slidable separation between the top housing portion and the bottom housing portion revealing the keypad corresponding to the bottom portion;
sensing a communication adapter connected to a communication connector with a communication sensor that is connected to the communication connector, wherein a Bluetooth module is connected to the communication sensor;
sensing a connection of a power source to the slider wireless communication device with a power connection sensor, wherein a Bluetooth module is connected to the power connection sensor;
wherein when the communication adapter is connected to the slider wireless communication device and a power source is connected to the slider wireless communication device the Bluetooth module receives notification that the communication adapter is connected to the communication connector and that the power source is connected to the slider wireless communication device and enters the activity state in response to the notification.

18. The method of claim 17, wherein the step of waking up the Bluetooth module comprises the steps of: changing a state of the Bluetooth module from a stand by state to a page state.

19. The method of claim 17, wherein the step of waking up the Bluetooth module comprises the steps of: changing a state of the Bluetooth module from a stand by state to a page scan state.

20. The method of claim 17, wherein the step of waking up the Bluetooth module comprises the steps of: changing a state of the Bluetooth module from a stand by state to an inquiry state.

21. The method of claim 17, wherein the step of waking up the Bluetooth module comprises the steps of: changing a state of the Bluetooth module from a stand by state to an inquiry scan state.

22. The method of claim 17, wherein the step of waking up the Bluetooth module comprises the steps of: changing a state of the Bluetooth module from a park state to a connection state, wherein the park state is the state in which the Bluetooth module of a slave Bluetooth device is made to turn its receiver off except at regular intervals.

23. The method of claim 17, wherein the step of waking up the Bluetooth module comprises the steps of: changing a mode of the Bluetooth module from a sniff mode to an active mode, wherein the sniff mode is the Bluetooth mode in which a slave Bluetooth device is made to turn its receiver off except at regular intervals.

24. The method of claim 17, wherein the step of waking up the Bluetooth module comprises the steps of: changing a mode of the Bluetooth module from a hold mode to an active mode, wherein the hold mode is the Bluetooth mode in which a slave Bluetooth device is made to turn its receiver off for a predetermined time period.

25. The method of claim 17, wherein the step of receiving an indication of a user intervention event comprises the step of receiving a key input signal.

26. The method of claim 17, wherein the step of receiving an indication of a user intervention event comprises the step of receiving a voice activated signal.

27. The method of claim 17, wherein the step of receiving an indication of a user intervention event comprises the steps of: receiving a menu navigation command; and receiving a menu selection command.

28. The method of claim 17, wherein the step of receiving an indication of a user intervention event comprises the step of sensing a reconfiguration of a wireless communication device.

29. The method of claim 28, wherein the step of sensing a reconfiguration comprises the step of sensing sliding a first housing portion relative to a second housing portion.

30. The method of claim 28, wherein the step of sensing a reconfiguration comprises the step of sensing rotating a first housing portion relative to a second housing portion.

31. A slider wireless communication device comprising:
a top housing portion for the slider wireless communication device;
a bottom housing portion having a keypad, wherein the top housing portion is slidably connected to the bottom housing;
the top housing portion configured to slide over the bottom housing portion covering the keypad;

a mechanical configuration user intervention event that is triggered when the top housing portion is slidably separated from the bottom housing portion revealing the keypad corresponding to the bottom portion and extending the length of the slider wireless communication device;

a configuration sensor that is configured to sense a user interacting with the slider wireless communication device and triggering the mechanical configuration user intervention event, wherein the configuration sensor detects the slidable separation between the top housing portion and the bottom housing portion that reveals the keypad corresponding to the bottom portion;

a Bluetooth module capable of waking up form a passive stand by state, in which a Bluetooth state is on but not transmitting or receiving, to an activity state in response to triggering the mechanical configuration user intervention event when the configuration sensor has detected the slidable separation between the top housing portion and the lower housing portion revealing the keypad corresponding to the bottom portion;

a Bluetooth radio frequency circuit connected to the Bluetooth module and configured to receive and transmit Bluetooth signals;

a communication sensor connected to a communication connector;

a power source connected to the slider wireless communication device;

wherein the communication sensor senses a communication adapter connected to the communication connector, wherein a Bluetooth module is connected to the communication sensor;

wherein a power source sensor senses a connection of the power source to the slider wireless communication device, wherein a Bluetooth module is connected to the power source sensor;

wherein when the communication adapter is connected to the slider wireless communication device and the power source is connected to the slider wireless communication device the Bluetooth module receives notification that the communication adapter is connected to the communication connector and that the power source is connected to the slider wireless communication device and enters the activity state in response to the notification.

32. The slider wireless communication device of claim 31, further comprising: a wireless communication transceiver other than a Bluetooth transceiver; and a portable power supply connected to the Bluetooth RF circuit and to the other wireless communication transceiver to supplying portable power to the Bluetooth RF circuit and to the other wireless communication transceiver.

33. The slider wireless communication device of claim 32, wherein the other wireless communication transceiver comprises a communication band that overlaps with a Bluetooth communication band.

34. The slider wireless communication device of claim 33, wherein the other wireless communication transceiver comprises an IEEE 802.11 transceiver.

35. The slider wireless communication device of claim 34, wherein the Bluetooth state machine is: connected to the IEEE 802.11 transceiver; and configured to cause the Bluetooth module to enter a passive state, responsive to sensing an IEEE 802.11 signal.

* * * * *